US011989045B2

(12) United States Patent
Vangara et al.

(10) Patent No.: US 11,989,045 B2
(45) Date of Patent: May 21, 2024

(54) LDO WITH SELF-CALIBRATING COMPENSATION OF RESONANCE EFFECTS

(71) Applicant: pSemi Corporation, San Diego, CA (US)

(72) Inventors: Satish Kumar Vangara, Woodley (GB); Amr Ahmed Kamel, Reading (GB)

(73) Assignee: pSemi Corporation, San Diego, CA (US)

( * ) Notice: Subject to any disclaimer, the term of this patent is extended or adjusted under 35 U.S.C. 154(b) by 183 days.

(21) Appl. No.: 17/513,112

(22) Filed: Oct. 28, 2021

(65) Prior Publication Data

US 2022/0137656 A1 May 5, 2022

(30) Foreign Application Priority Data

Nov. 3, 2020 (EP) .................................... 20205374

(51) Int. Cl.
*G05F 1/575* (2006.01)
*G05F 1/565* (2006.01)

(52) U.S. Cl.
CPC .............. *G05F 1/575* (2013.01); *G05F 1/565* (2013.01)

(58) Field of Classification Search
CPC ................................. G05F 1/565; G05F 1/575
See application file for complete search history.

(56) References Cited

U.S. PATENT DOCUMENTS 8,604,762 B2 * 12/2013 Bakkaloglu ............. H03F 1/086 323/280
2011/0012582 A1 1/2011 Aisu
(Continued)

FOREIGN PATENT DOCUMENTS

KR 10-2015-0064984 6/2015
WO 2009-083498 7/2009

OTHER PUBLICATIONS

Bellatalla, Filippo, Invitation pursuant to Rule 62a(1) EPC received from the EPO dated Apr. 19, 2021 for appln. No. 20205374.0, 2 pgs.
(Continued)

*Primary Examiner* — Jue Zhang
*Assistant Examiner* — Lakaisha Jackson
(74) *Attorney, Agent, or Firm* — JAQUEZ LAND GREENHAUS & McFARLAND LLP; John Land, Esq.

(57) ABSTRACT

Low drop-out (LDO) regulator circuits and methods that can operate at high frequencies without the adverse consequences of an oscillatory resonance effect from a capacitive load. In a first embodiment, a low pass filter (LPF) is coupled to the LDO and tuned to cancel the oscillatory resonance effect. In a second embodiment, the LPF is a second-order LPF and/or programmable. Since the tuning values of the programmable LPF may be programmatically selected, a much greater range of external capacitors values (with attendant ESR and ESL values), as well as a wider range of system parasitic capacitances, can be accommodated while maintaining system stability. Some variants of the second embodiment include an oscillation detector and filter bit control circuit that allows the tuning values of the programmable LPF to be dynamically determined and re-determined. An impedance-lowering device may be coupled to lower the impedance of the connection to the LPF.

20 Claims, 9 Drawing Sheets

(56) References Cited

U.S. PATENT DOCUMENTS

| | | | | |
|---|---|---|---|---|
| 2014/0266104 | A1 | 9/2014 | El-Nozahi et al. | |
| 2014/0266106 | A1* | 9/2014 | El-Nozahi | G05F 1/573 323/280 |
| 2015/0115918 | A1* | 4/2015 | Oikarinen | G05F 1/575 323/280 |
| 2015/0171743 | A1 | 6/2015 | Yeon et al. | |
| 2016/0204702 | A1 | 7/2016 | Padyana et al. | |
| 2017/0126329 | A1 | 5/2017 | Gorecki et al. | |
| 2019/0020331 | A1* | 1/2019 | Yang | A61F 2/18 |

OTHER PUBLICATIONS

Bellatalla, Filippo, Communication received from the EPO dated Jun. 2, 2021 for appln. No. 20205374.0, 12 pgs.

Park, Hye Lyun, International Search Report and Written Opinion received from KIPO dated Feb. 23, 2022 for appln. No. PCT/US2021/057138, 9 pgs.

* cited by examiner

300

LDO WITH SELF-CALIBRATING COMPENSATION OF RESONANCE EFFECTS

BACKGROUND

The present application claims priority to European Patent Application No. EP20205374.0, filed on Nov. 3, 2020, titled "LDO with Self-Calibrating Compensation of Resonance Effects", which is herein incorporated by reference in its entirety.

BACKGROUND

(1) Technical Field

This invention relates to electronic circuitry, and more particularly to regulator circuits for switched-mode power supplies.

(2) Background

An electronic switched-mode power supply (SMPS) transfers power from a DC or AC source to DC loads, such as the electronic components within a personal computer or cellular phone, while converting voltage and current characteristics. Voltage regulation is achieved by varying the ratio of ON-to-OFF time of a pass transistor rather than by power dissipation, as in linear power supplies, resulting in high power conversion efficiency. Switched-mode power supplies may also be substantially smaller and lighter than a linear power supply, and accordingly are quite useful in portable electronic devices.

The characteristic switching operation of an SMPS means that the output voltage of the SMPS is not flat, but includes a ripple voltage. A ripple voltage is very undesirable when powering noise-sensitive circuitry, particularly radio frequency (RF) circuitry. Accordingly, the output of an SMPS is generally regulated to suppress or eliminate the ripple voltage.

For example, FIG. 1 is a block diagram 100 of a generalized prior art electronic circuit powered by an SMPS 102. As illustrated, the SMPS 102 outputs a supply voltage 104 that includes a ripple voltage. A low drop-out (LDO) regulator 106 having a sufficiently high Power Supply Rejection Ratio (PSRR) filters out the SMPS output voltage ripples and provides an essentially constant DC power output voltage 108. PSRR is a conventional measure of the capability of an LDO regulator circuit 106 to suppress any power supply variations to its output signal. The "clean" voltage output from the LDO regulator circuit 106 may then be provided to noise-sensitive circuitry 110, which may be, for example, RF circuitry including mixers, low noise amplifiers (LNAs), phase locked loops (PLLs), voltage controlled oscillators (VCOs), etc.

An LDO regulator circuit is a DC linear voltage regulator that can regulate an output voltage even when the supply voltage is very close to the output voltage. LDO regulator circuits avoid switching noise (as no switching takes place), generally have a small device size (as neither large inductors nor transformers are needed), and often have a relatively simple circuit architecture (usually comprising a voltage reference, a differential error amplifier, and a pass transistor).

A trend in the power supply industry has been to increase the switching frequency of SMPSs embodied (at least in part) in integrated circuits (ICs) in order to scale down the size of needed inductors and reduce the die area required for the SMPS. For example, the trend has been to move from a switching frequency of about 100 kHz to about 1 MHz. However, high switching frequencies lead to high frequency output ripple voltage, which must be filtered out when powering noise-sensitive circuitry. Accordingly, an LDO regulator circuit 106 must have a very high PSRR to adequately suppress ripples caused by high switching frequencies.

Another problem that arises with high frequency SMPS's is oscillatory resonance effects. An LDO regulator circuit designed to achieve high PSRR at high frequencies is often designed to have a high unity gain bandwidth (UGB) at the highest frequencies (e.g., around 1 MHz). However, the Equivalent Series Resistance (ESR) and Equivalent Series Inductance (ESL) of load capacitances cause a resonance effect—that is, oscillations—at those high frequencies. If the loop UGB for an LDO regulator circuit is close to the capacitance resonance frequency, the resonance effect causes feedback loop instability and degrades phase margin, which lessens the "safety margin" that ensures proper non-oscillatory operation of the LDO regulator circuit.

For example, FIG. 2 is a schematic diagram 200 of a simplified prior art LDO regulator circuit 201 connected to a capacitive output load 202. A differential error amplifier 204 has a first input connected to a stable reference voltage $V_{REF}$ (e.g., a bandgap reference) and an output connected to the gate of a driver field effect transistor (FET) M1, which may be, for example, a MOSFET. The error amplifier 204 is powered by a voltage source to be regulated, $V_{IN}$, and connected to circuit ground. The driver FET M1 and a current source 203 are series-connected in a source follower circuit configuration between $V_{IN}$ and circuit ground. A node between the driver FET M1 and the current source 203 is connected to the gate of a pass FET M2. The source follower circuit offers low impedance at the gate of the pass FET M2 and makes the pole at that point non dominant. In addition, the source follower circuit acts as a voltage level shifter to set a proper voltage at the output of the error amplifier 204. The pass FET M2 is connected as shown between $V_{IN}$ and a voltage divider 206 comprising resistors R1 and R2 connected in series between the pass FET M2 and circuit ground. A node X between resistors R1 and R2 is connected to a second input of the error amplifier 204. The output of the LDO regulator circuit 201 is connected to a capacitive output load 202. Note that in some designs, $V_{OUT}$ is directly connected to the second input of the error amplifier 204 (i.e., the voltage divider 206 is omitted).

In operation, the input to the error amplifier 204 from node X compares a fraction of the output, $V_{OUT}$, from the pass FET M2 (determined by the resistor ratio of R1 and R2) against the reference voltage $V_{REF}$. If the output voltage $V_{OUT}$ rises too high relative to the reference voltage $V_{REF}$, the output of the error amplifier 204 changes and the source follower circuit (i.e., the driver FET M1 and the current source 203) output follows that change, thereby changing the drive bias to the pass FET M2 so as to maintain a constant output voltage $V_{OUT}$.

The output load 202 has a capacitance, $C_{LOAD}$, which may constitute intentional circuit elements as well as parasitic capacitances. The impedance of the load capacitor $C_{LOAD}$ is a function not only of the value of the load capacitor $C_{LOAD}$ but also the values of an ESR and an ESL connected in series, as shown.

FIG. 3 is a graph 300 of Gain and Phase as a function of frequency for one modeled LDO regulator circuit of the type shown in FIG. 2. Referring to graph line 302, as frequency increases, the gain remains essentially constant up to a point (i.e., the dominant pole) and then declines towards zero gain. Concurrently, as shown by graph line 304, the phase remains essentially constant until beginning to drop towards zero degrees near the dominant pole. However, as frequency increases, the impedance of the load capacitor $C_{LOAD}$ becomes inductive due to its ESR and ESL characteristics, which causes an inflection in the graph line 302 that essentially delays the zero crossing point of the gain. Since phase margin is measured at the frequency when gain crosses 0 dB, the illustrated phase margin is negative at that frequency. The graph 300 essentially shows that the resonance effect is equivalent to having two zeros and stops gain from reaching 0 dB before the non-dominant poles of the circuit become effective. As should be clear, if the UGB is close to the non-dominant poles, phase falls to the point of no phase margin and the system is unstable.

Accordingly, there is a need for an LDO regulator circuit that can operate at high frequencies (e.g., about 1 MHz) without the adverse consequences of the effect of resonance due to a capacitive load. The present invention addresses this need.

SUMMARY

The invention encompasses low drop-out (LDO) regulator circuits and methods that can operate at high frequencies (e.g., at or above about 1 MHz) without the adverse consequences of the effect of resonance from a capacitive load.

In a first embodiment of an LDO regulator circuit in accordance with the present invention, a low pass filter (LPF), which may be a second-order LPF, is inserted between the output of the LDO error amplifier and the gate of a driver FET M1. The LPF is tuned to at least partially cancel the effect of resonance due to the capacitive output load. In the case of a second-order LPF, the second-order LPF has two poles which, by suitable selection of RC component values, can be tuned to oppose the two-zeros resonance effect in frequency response.

In a second embodiment of an LDO regulator circuit in accordance with the present invention, a programmable low pass filter (LPF), which may be a second-order LPF, is inserted between the output of the error amplifier and the gate of the driver FET. Since any of multiple tuning values of the programmable LPF may be programmatically selected, a much greater range of external capacitors values (with attendant ESR and ESL values), as well as a wider range of system parasitic capacitances, can be accommodated while maintaining system stability.

Some variants of the second embodiment include an oscillation detector and filter bit control (ODFBC) circuit that allows the tuning values of the programmable LPF to be dynamically determined and re-determined. Accordingly, the tuning values can be adjusted for a final product configuration as well as from time to time to accommodate changes in the values of various system components and parasitic elements (e.g., due to temperature or humidity fluctuations or component aging). The ODFBC circuit detects oscillations in $V_{OUT}$ (preferably in a manner that ignores transient glitches) and generates a new filter bit pattern (which may be a sequential countdown) that selects a different combination of capacitors in the programmable LPF, and thus a different bandwidth. This process iterates (oscillation detection and new filter bit pattern generation) until oscillations are no longer detected, thus indicating that the feedback loop of the LDO regulator circuit is stable. Accordingly, this embodiment of the LDO regulator circuit provides for self-calibration that may be repeated from time to time.

Embodiments generally include an impedance-lowering device (e.g., a diode-connected FET) coupled between $V_{IN}$ and the output of the error amplifier, before the input to the LPF. Inserting an impedance-lowering device at that location lowers the impedance of the connection between the error amplifier and the LPF, thus avoiding significant disturbance by the LPF to the existing poles and zeros in the circuit.

The details of one or more embodiments of the invention are set forth in the accompanying drawings and the description below. Other features, objects, and advantages of the invention will be apparent from the description and drawings, and from the claims.

DESCRIPTION OF THE DRAWINGS

Like reference numbers and designations in the various drawings indicate like elements unless otherwise indicated.

DETAILED DESCRIPTION

The invention encompasses low drop-out (LDO) regulator circuits and methods that can operate at high frequencies (e.g., at or above about 1 MHz) without the adverse consequences of the effect of resonance from a capacitive load.

First Embodiment

Figure 1:
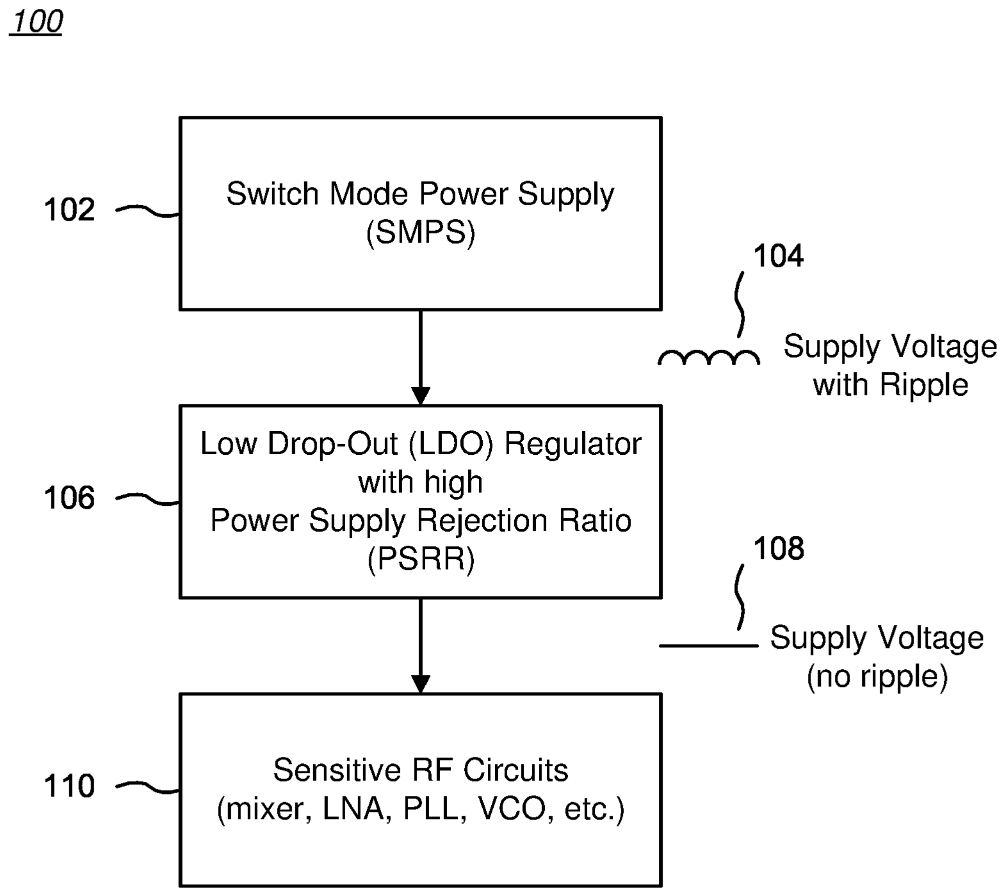
FIG. 1 (Prior Art)
FIG. 1 is a block diagram of a generalized prior art electronic circuit powered by an SMPS.
Figure 2:
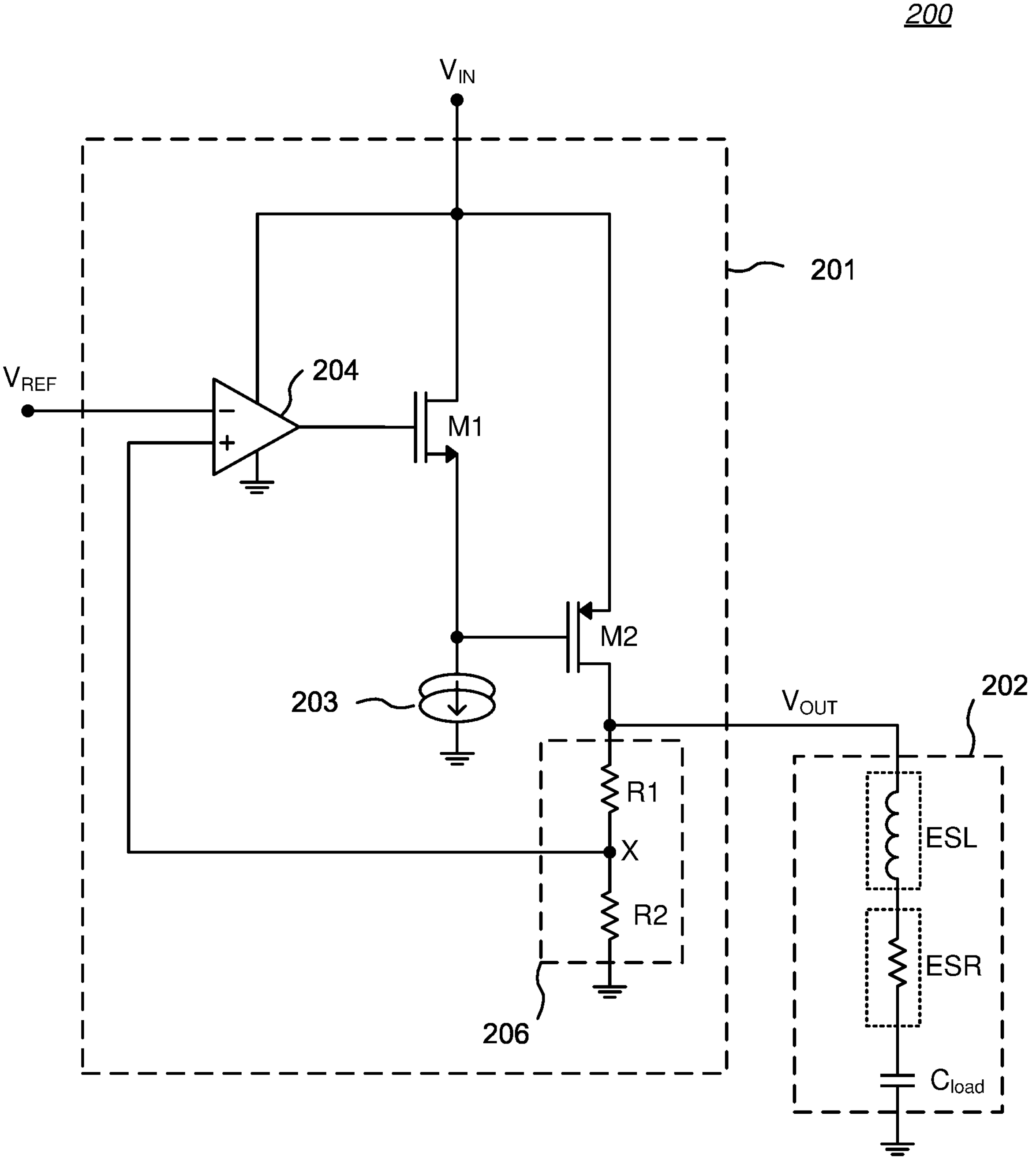
FIG. 2 (Prior Art)
FIG. 2 is a schematic diagram of a simplified prior art LDO regulator circuit coupled to a capacitive output load.
Figure 4:
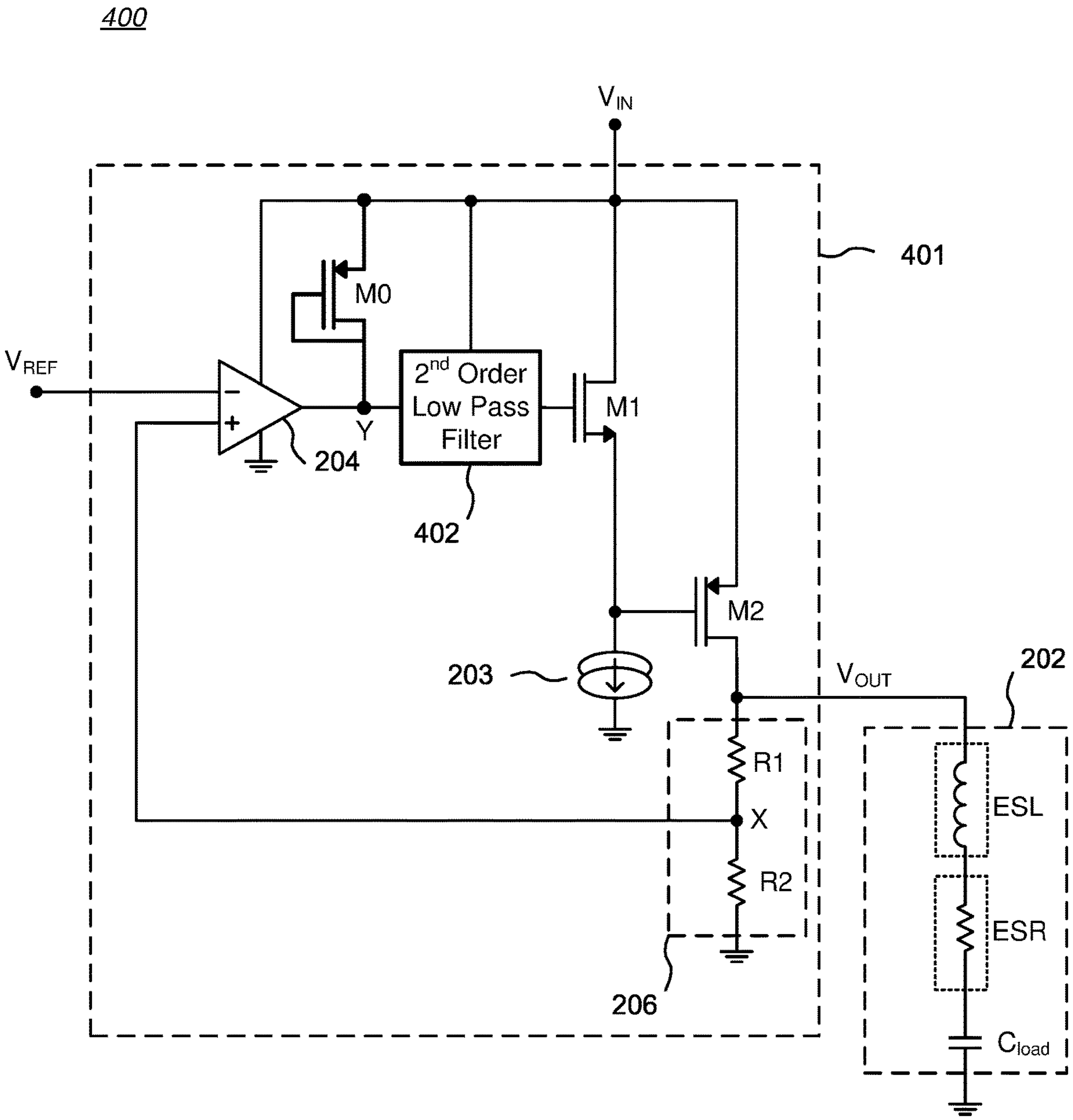
FIG. 4 is a schematic diagram of a first embodiment of an LDO regulator circuit in accordance with the present invention, coupled to an output load.

FIG. 4 is a schematic diagram 400 of a first embodiment of an LDO regulator circuit 401 in accordance with the present invention, coupled to an output load 202. The LDO regulator circuit 401 is similar in most structural and operational aspects to the LDO regulator circuit 201 of FIG. 2, but adds two important circuit elements.

Figure 5:
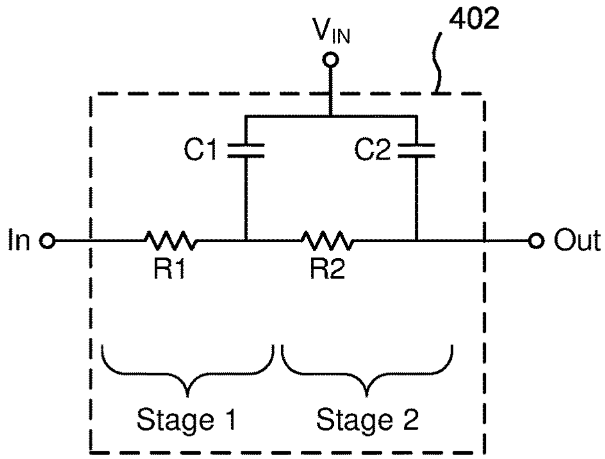
FIG. 5 is a schematic diagram of one embodiment of a second-order LPF that may be used in the LDO regulator circuit of FIG. 4.

A first added circuit element in the illustrated example is a second-order (two pole) low pass filter (LPF) 402 inserted between the output of the error amplifier 204 and the gate of the driver FET M1. FIG. 5 is a schematic diagram of one embodiment of a second-order LPF 402 that may be used in the LDO regulator circuit 401 of FIG. 4. The illustrated second-order LPF 402 is a conventional design that includes a pair of series-connected RC circuit stages, Stage 1 and Stage 2. As should be clear, other circuits may be used for the second-order LPF 402.

The second-order LPF 402 is tuned to at least partially cancel the effect of the resonance of the capacitive output load 202, specifically an oscillation of the output ($V_{OUT}$). More specifically, the second-order LPF 402 has two poles which, by suitable selection of RC component values, can be tuned to oppose the two-zeros resonance effect in frequency response.

It is highly desirable, and in some embodiments necessary, to connect the second-order LPF 402 at a low impedance node in the feedback loop of the LDO regulator circuit 401 so that the second-order LPF 402 does not disturb existing poles and zeros in the circuit. In addition, the node impedance should not affect the filter response. Accordingly, a second added circuit element is an impedance-lowering device coupled at a node Y between $V_{IN}$ and the output of the error amplifier 204, before the input to the second-order LPF 402. In the illustrated example, the impedance-lowering device is a diode-connected FET M0, which lowers the impedance of the connection between the error amplifier 204 and the second-order LPF 402.

Figure 3:
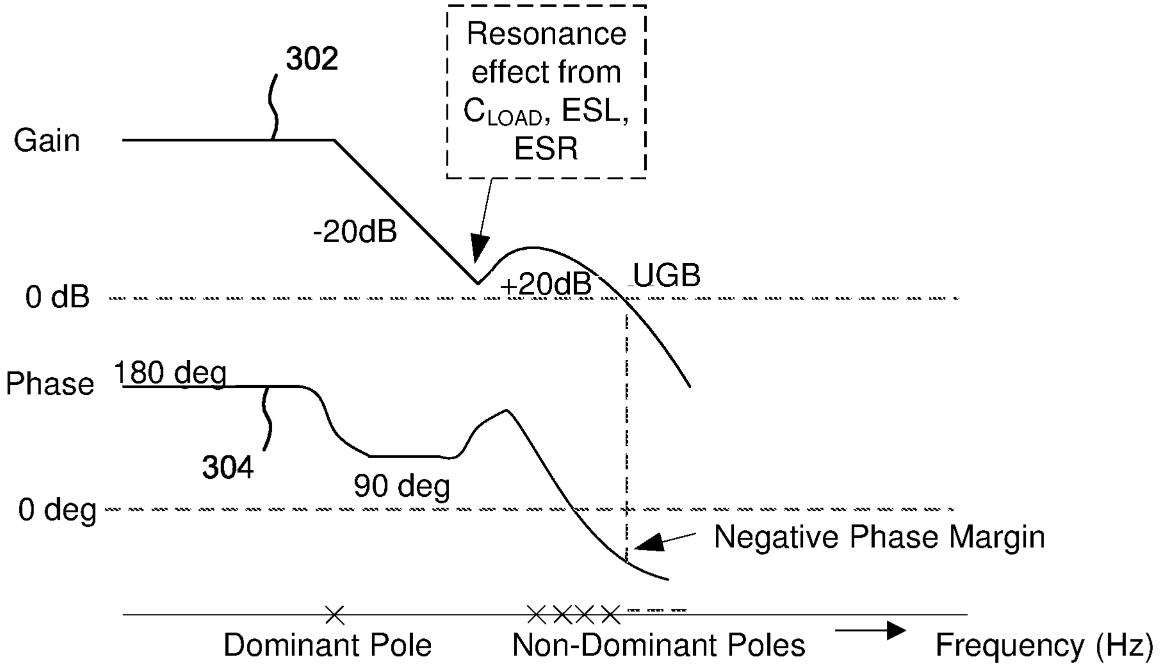
FIG. 3 is a graph of Gain and Phase as a function of frequency for one modeled LDO regulator circuit of the type shown in FIG. 2.
Figure 6:
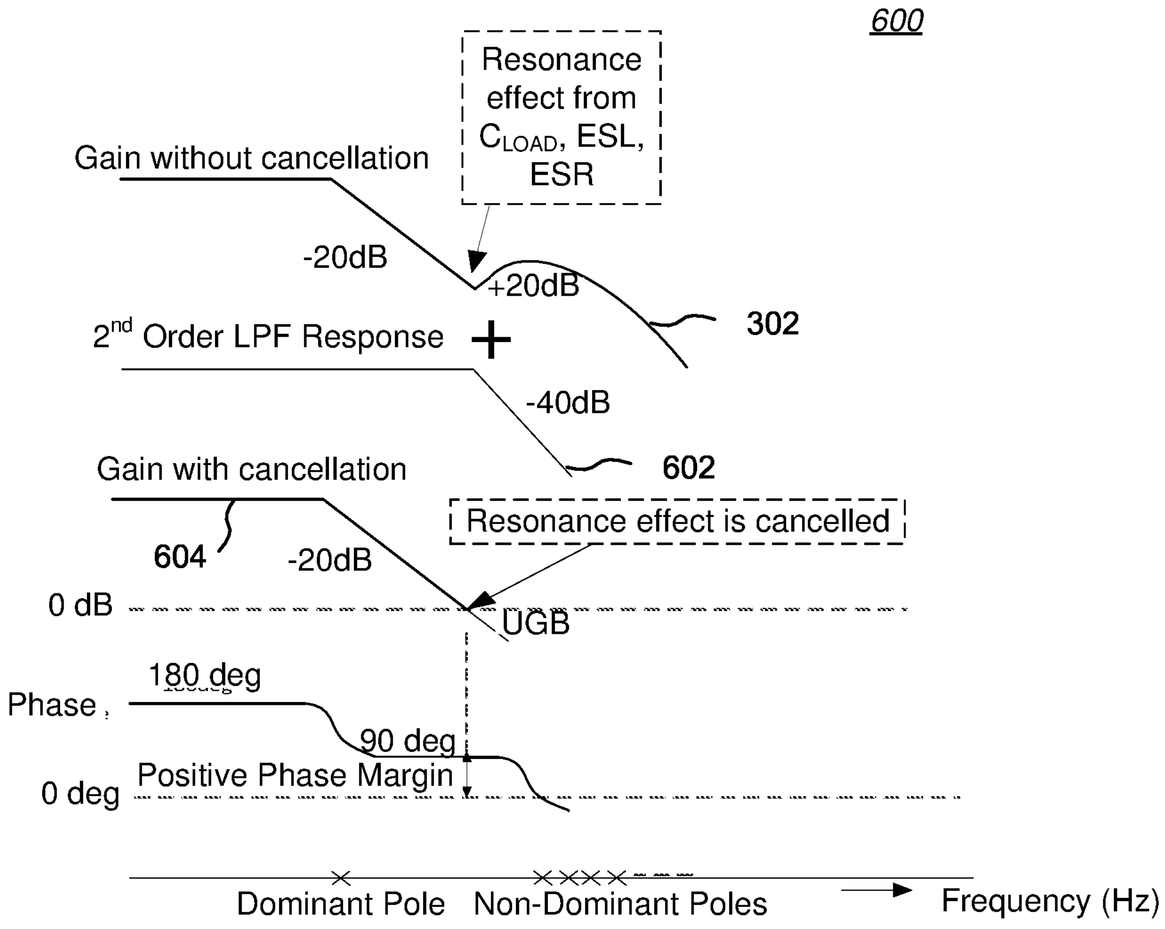
FIG. 6 is a graph of Gain and Phase as a function of frequency for one modeled LDO regulator circuit of the type shown in FIG. 4.

FIG. 6 is a graph 600 of Gain and Phase as a function of frequency for one modeled LDO regulator circuit of the type shown in FIG. 4. Graph line 302 is the same as shown in FIG. 3. Graph line 602 shows the frequency response of the second-order LPF 402. The frequency responses of both lines are essentially added, resulting in graph line 604, showing that the frequency response of the second-order LPF 402 essentially at least partially cancels the inflection in the graph line 302 due to the ESR and ESL characteristics of the load capacitor CLOAK, thus opposing the frequency response of the resonance effect. As a result, the phase margin is positive at the frequency of the 0 dB crossing point for UGB. In the illustrated example, the phase margin is about 90 degrees and accordingly the system is stable.

Second Embodiment

The component values of the LPF 402 of the first embodiment can be selected for a specified external capacitive load $C_{LOAD}$ value range, a known range of system parasitic capacitances and resistances, and a known range for the capacitor ESR and ESL values. However, if the $C_{LOAD}$, ESR, ESL, and/or the system parasitic capacitance and resistance values exceeds the specified range, the feedback loop of the LDO regulator circuit 401 may become unstable. Accordingly, it would be useful to accommodate a greater range of external capacitors values (with attendant ESR and ESL values) that may be selected by a customer, and to more precisely take into account system parasitic capacitances.

Figure 7:
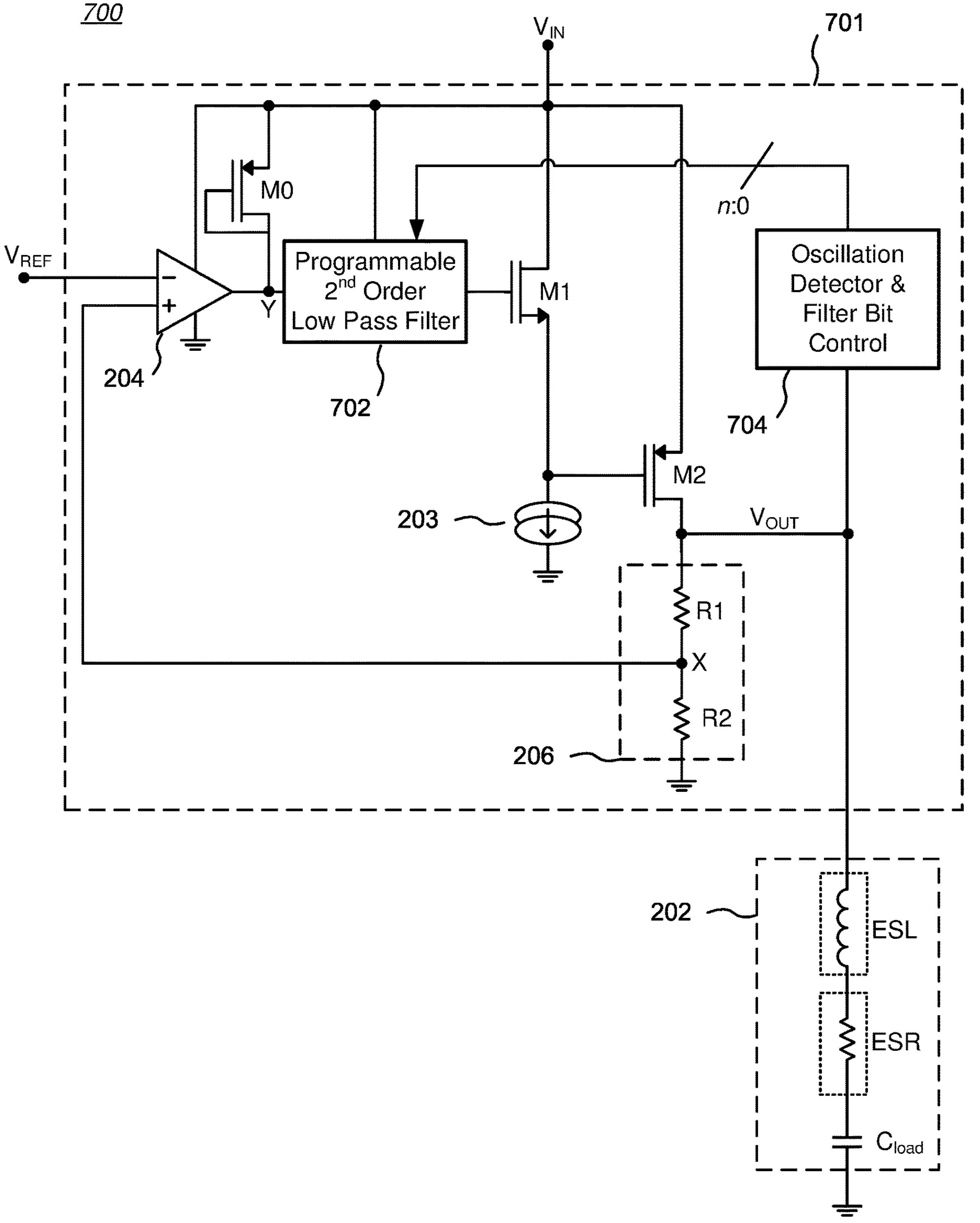
FIG. 7 is a schematic diagram of a second embodiment of an LDO regulator circuit in accordance with the present invention, coupled to an output load.

FIG. 7 is a schematic diagram 700 of a second embodiment of an LDO regulator circuit 701 in accordance with the present invention, coupled to an output load 202. LDO regulator circuit 701 is similar in most structural and operational aspects to the LDO regulator circuit 401 of FIG. 4 (including an impedance-lowering device), but adds or modifies one or two important circuit elements.

A first added circuit element is a programmable second-order (two pole) low pass filter (LPF) 702 inserted between the output of the error amplifier 204 and the gate of the driver FET M1 in place of the non-programmable second-order LPF 402 of FIG. 4. Since the tuning values of the programmable second-order LPF 702 may be programmatically selected, a much greater range of external capacitors values (with attendant ESR and ESL values), as well as a wider range of system parasitic capacitances and resistances, can be accommodated while maintaining system stability.

Figure 8:
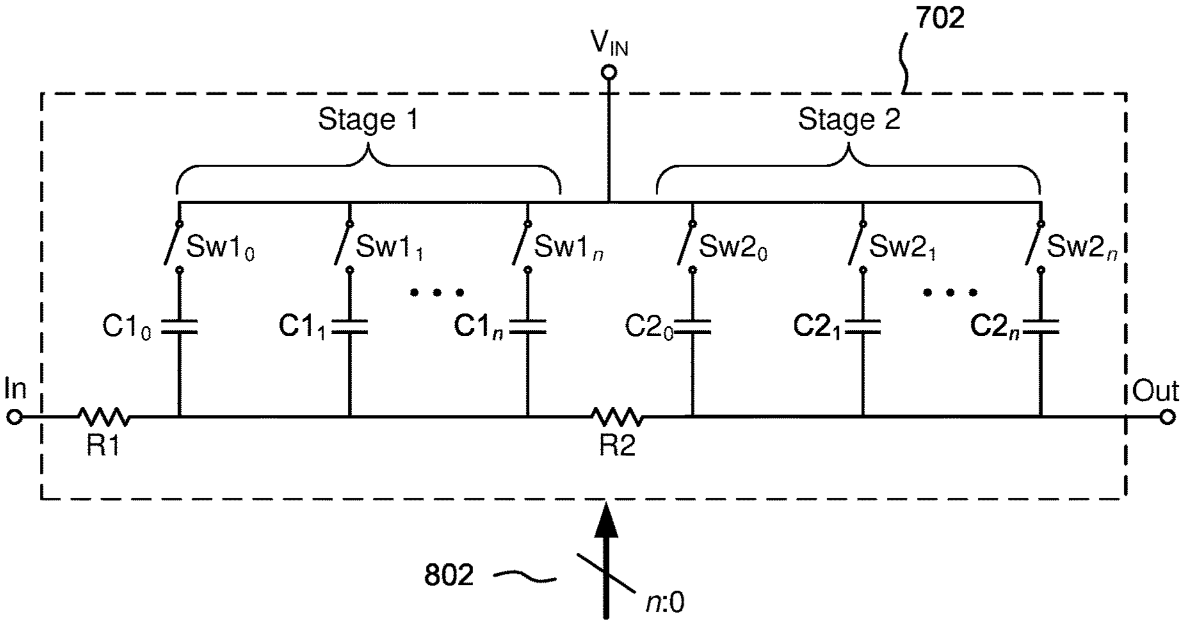
FIG. 8 is a schematic diagram of one embodiment of a programmable second-order LPF that may be used in the LDO regulator circuit of FIG. 7.

FIG. 8 is a schematic diagram of one embodiment of a programmable second-order LPF 702 that may be used in the LDO regulator circuit 701 of FIG. 7. The illustrated second-order LPF 702 includes a pair of series-connected RC circuit stages, Stage 1 and Stage 2. Each stage includes a corresponding resistor R1, R2, and two or more parallel-coupled capacitors $C1_0$-$C1_n$, $C2_0$-$C2_n$ for a total of N=n+1 capacitors per stage. Each capacitor $C1_0$-$C1_n$, $C2_0$-$C2_n$ is coupled to $V_{IN}$ through a corresponding switch $Sw1_0$-$Sw1n$, $Sw2_0$-$Sw2n$, which may be MOSFET switches. In FIG. 8, $V_{IN}$ is shown as a single voltage supplied to all capacitors $C1_0$-$C1_n$, $C2_0$-$C2_n$. However, in some embodiments, $V_{IN}$ may be a bus of supply voltages, one for each capacitor-switch pair. The ON or OFF state of the switches $Sw1_0$-$Sw1n$, $Sw2_0$-$Sw2n$ may be controlled by corresponding lines from a control signal bus 802, such as an N-bit binary signal set having bits n:0.

In the preferred embodiment, the switches in Stage 1 and Stage 2 of FIG. 8 are switched in unison. For example, if switches $Sw1_1$, $Sw2_1$ are closed and all other switches are open, then capacitor $C1_1$ of Stage 1 and capacitor $C2_1$ of Stage 2 are in circuit and set the tuning state of the programmable second-order LPF 702. In other embodiments, the switches $Sw1_0$-$Sw1n$, $Sw2_0$-$Sw2n$ in Stage 1 and Stage 2 respectively may be switched independently or according to a preferred sequence in order to place a desired number of the capacitors $C1_0$-$C1_n$, $C2_0$-$C2_n$ in circuit.

The number of tuning states for the programmable second-order LPF 702 is determined by the number N of capacitors per stage, and is $2^N$ for the illustrated circuit. If one capacitor is connected by default (in which case, the corresponding switch may be replaced by a fixed connection), then the number of tuning states for N capacitors per stage would be $2^{N-1}$. For example, if the number of capacitors N per stage is 4, then the programmable second-order LPF 702 may be set to any of 16 ($2^4$) tuning states. As should be clear, other circuits may be used for the programmable second-order LPF 702.

The tuning values of the programmable second-order LPF 702 may be selected during product testing by detecting oscillations in $V_{OUT}$ and generating a filter bit pattern (e.g., bits n:0) that sets the bandwidth of the programmable second-order LPF 702 to at least partially cancel out the effect of resonance due to a capacitive load. The bit pattern may be fixed, for example, in a programmable memory device (e.g., a PROM or EEROM) or circuit fuse bits, in known fashion.

However, by adding a second circuit element, an oscillation detector and filter bit control (ODFBC) circuit 704, the tuning values of the programmable second-order LPF 702 can be dynamically determined and re-determined. Accordingly, the tuning values can be adjusted for a final product configuration as well as from time to time to accommodate changes in the values of various system components and parasitic elements (e.g., due to temperature or humidity fluctuations or component aging). The ODFBC circuit 704 detects oscillations in $V_{OUT}$ (preferably in a manner that ignores transient glitches) and generates a new filter bit pattern as an N-bit binary signal set having bits n:0 (which may be a sequential countdown) that selects a different combination of capacitors in Stage 1 and Stage 2 of the programmable second-order LPF 702, and thus a different bandwidth. This process iterates (oscillation detection and new filter bit pattern generation) until oscillations are no longer detected, thus indicating that the feedback loop is stable. Accordingly, this embodiment of the LDO regulator circuit 701 provides for self-calibration that may be repeated from time to time.

In either case—one-time testing and setting of filter bit values or self-calibration—the final filter bit pattern results in a selection of capacitors in Stage 1 and Stage 2 of the programmable second-order LPF 702 that provide stability by at least partially cancelling out the effect of resonance resulting from the actual external capacitor value (with attendant ESR and ESL values) and the actual system parasitic capacitance and resistance. In some embodiments, the final filter bit pattern may be slightly adjusted (e.g., resulting in slightly less bandwidth for the programmable second-order LPF 702) to provide some margin of safety against recurrence of oscillations by further improving the phase margin.

Figure 9:
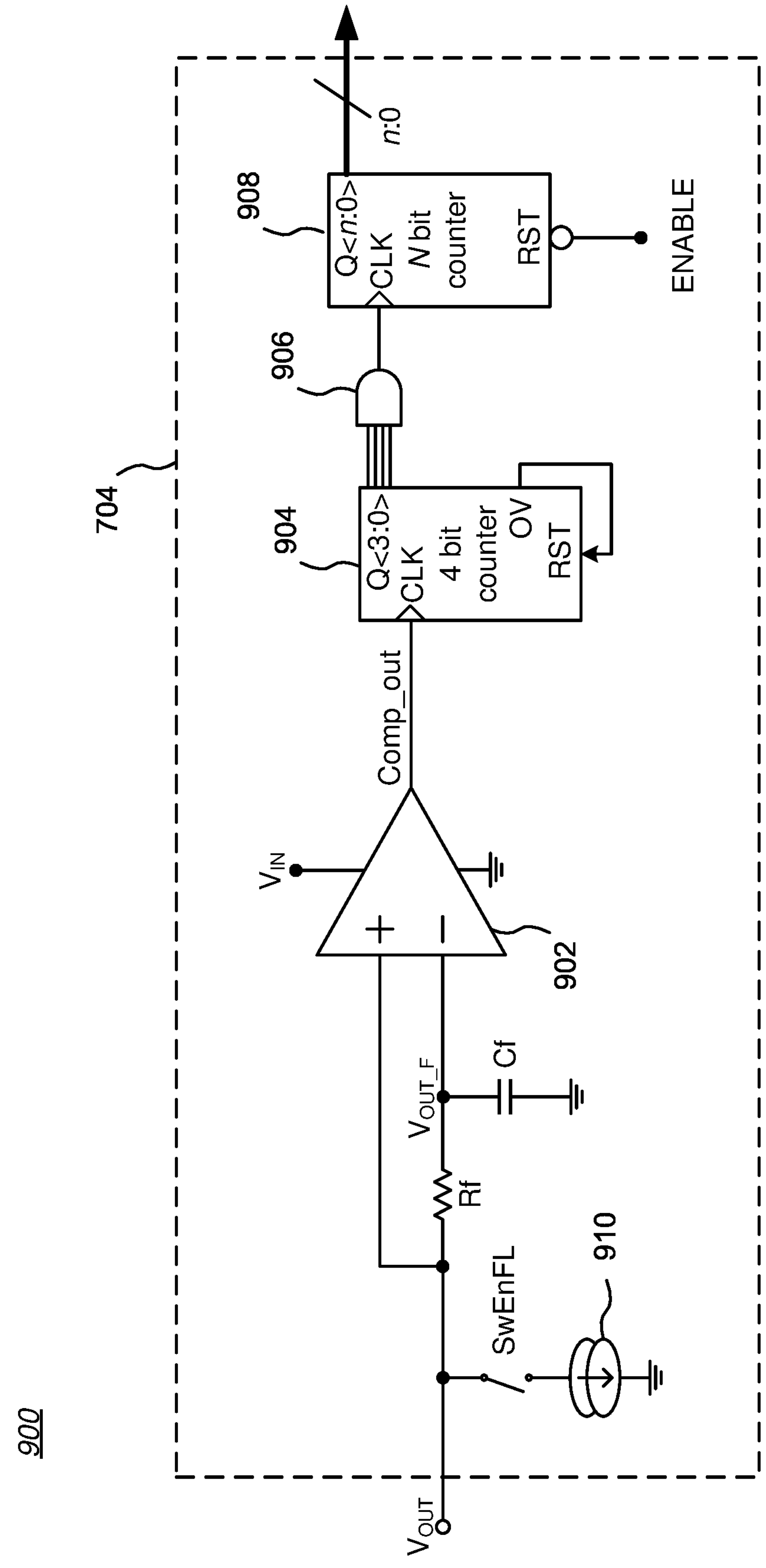
FIG. 9 is a schematic diagram of one embodiment of an ODFBC circuit.

FIG. 9 is a schematic diagram 900 of one embodiment of an ODFBC circuit 704. The output $V_{OUT}$ of the LDO regulator circuit 701 of FIG. 7 is coupled to a first input of a comparator 902 and to an RC filter circuit comprising a series resistor Rf and a shunt capacitor Cf. A node between the resistor Rf and the capacitor Cf is coupled to a second input of the comparator 902 and represents a version, $V_{OUT\_F}$, of $V_{OUT}$ that filters out essentially all AC content, thus presenting a DC value for $V_{OUT}$. If the LDO regulator circuit 701 of FIG. 7 oscillates, its output $V_{OUT}$ is compared against its filtered version $V_{OUT\_F}$ by the comparator 902 of FIG. 9. Any difference between $V_{OUT}$ and $V_{OUT\_F}$ results in an output signal, Comp_out, from the comparator 902.

The Comp_out signal could be used directly to change the value of a filter bit pattern to be applied to the programmable second-order LPF 702. However, to make sure that the detected oscillations in $V_{OUT}$ are real and not transient glitches, in the illustrated embodiment, the Comp_out signal is applied to the clock input (CLK) of a first counter 904, which is this example is a 4-bit counter. The binary count output Q of the first counter 904 is coupled to an AND gate 906. As oscillations are detected by the comparator 902, the count output Q of the first counter 904 increments in response to reception of the Comp_out signal. When the count output Q of the first counter 904 reaches its maximum count value (binary "1111" in this example), then the AND gate 906 outputs a pulse to the clock input (CLK) of a second counter 908, and the first counter 904 resets itself to binary zero. Thus, in the illustrated example, 16 oscillations must be detected before the 4-bit first counter 904 increments the count output Q of the second counter 908. Fewer or more oscillations may be counted in alternative embodiments.

The second counter 908 is incremented by the pulse from the AND gate 906 and outputs an N-bit wide binary count output Q (i.e., bits n:0) to corresponding switches $Sw1_0$-$Sw1n$, $Sw2_0$-$Sw2n$ in the programmable second-order LPF 702, thereby setting a new tuning state for the programmable second-order LPF 702. For example, if N=4, and the count output Q of the second counter 908 is initially binary "0001", then a count of 16 oscillations made by the first counter 904 will cause the count output Q of the second counter 908 to increment to binary "0010". The new binary count will set a new tuning state for the programmable second-order LPF 702 as different capacitors $C1_0$-$C1_3$, $C2_0$-$C2_3$ are switched into circuit or out of circuit by corresponding switches $Sw1_0$-$Sw1_3$, $Sw2_0$-$Sw2_3$. An externally-supplied ENABLE signal applied to the reset (RST) input of the second counter 908 may be used to reset the second counter 908 for a new calibration cycle.

The comparator 902 of the ODFBC circuit 704 will continue to detect oscillations in $V_{OUT}$ until the count output Q of the second counter 908 reaches a value such that the tuning state of the programmable second-order LPF 702 is set to at least partially cancel out such oscillations. In preferred embodiments, the tuning state of the programmable second-order LPF 702 is initially set to have a wide bandwidth, and incrementing the count output Q of the second counter 908 results in a selection of capacitors $C1_0$-$C1_n$, $C2_0$-$C2_n$ that reduces that bandwidth by switching in more of the capacitors $C1_0$-$C1_n$, $C2_0$-$C2_n$ in parallel. In alternative embodiments, a decrementing count may be used to accomplish the same thing by suitable arrangement of the switches Sw0-Swn (e.g., by using inverters on the binary count output Q of the second counter 908). In some embodiments, the final filter bit pattern may be slightly adjusted (e.g., by incrementing the binary count output Q of the second counter 908 by one or more count values) to provide a tuning state that has some margin of safety against recurrence of oscillations by further improving the phase margin of the LDO regulator circuit 701 (e.g., to achieve at least a 45 degree margin).

It is generally desirable to check for oscillations in $V_{OUT}$ at a worst-case load condition of either "no load" or "full load". In the example embodiment shown in FIG. 9, a "full load" worst-case condition is provided by closing a switch, SwEnFL, to connect an internal load 910 to the input of the ODFBC circuit 704 after the LDO regulator circuit 701 is fully powered ON. A calibration cycle for the tuning state of the programmable second-order LPF 702 in the LDO regulator circuit 701 may then be performed as outlined above. Once the LDO regulator circuit 701 is calibrated (i.e., the "cancellation" bandwidth for the programmable second-order LPF 702 is selected), the internal load 910 may be switched out of circuit by opening switch SwEnFL.

The analog-and-digital circuit shown in FIG. 9 illustrates a straightforward implementation of an ODFBC circuit 704 that utilizes a few easy-to-implement components. However, other circuits may be used to detect oscillations in $V_{OUT}$ and set a tuning state for the programmable second-order LPF 702.

A self-calibration cycle for the tuning state of the programmable second-order LPF 702 may be performed after every startup of the LDO regulator circuit 701. This ensures that the bandwidth for the programmable second-order LPF 702 is selected to at least partially cancel out the effect of resonance resulting from the actual customer-selected external capacitor value (with attendant ESR and ESL values) and the actual system parasitic capacitance and resistance (including, for example, packaging and circuit board parasitic capacitance influences), regardless of component aging or environmental state (e.g., temperature and/or humidity). Embodiments of the present invention provide improved loop stability with good phase margin for the LDO regulator circuit 701, high loop bandwidths, high PSRR at high frequencies, and accommodation of a wide selection range for an external capacitive load.

Methods

Figure 10:
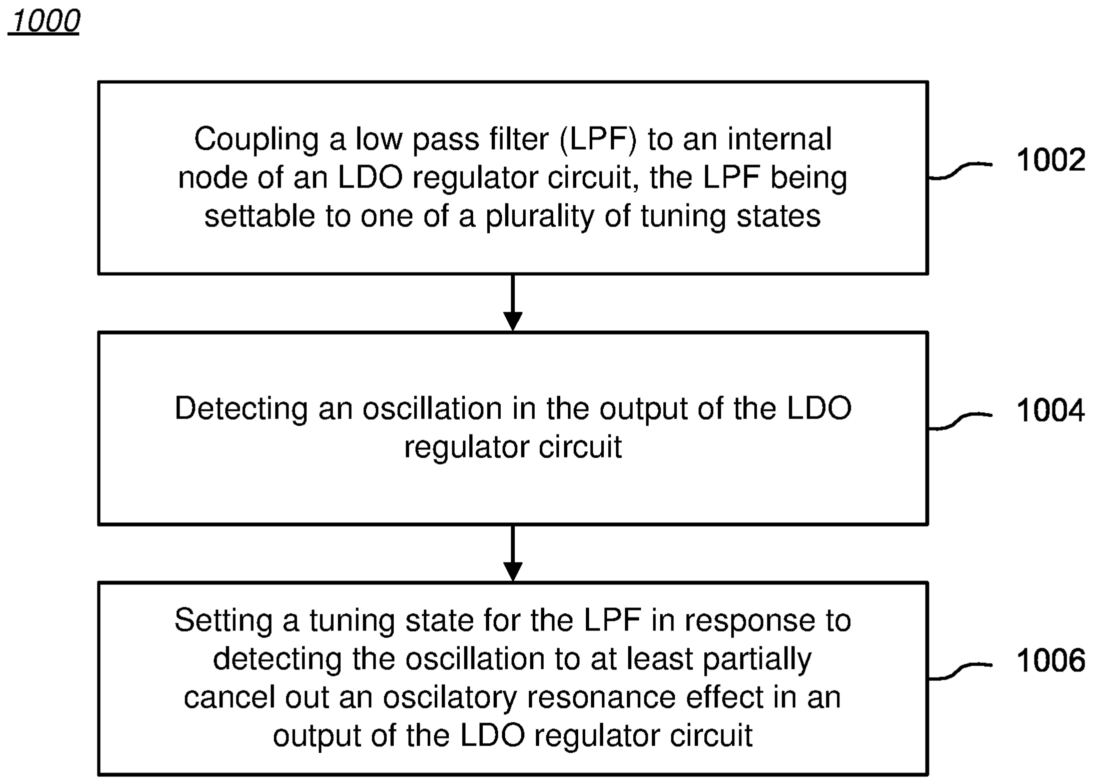
FIG. 10 is a process flow chart showing one method of at least partially cancelling out the effect of resonance in an output of an LDO regulator circuit.

Another aspect of the invention includes methods of at least partially cancelling out a resonance effect in an output of an LDO regulator circuit. For example, FIG. 10 is a process flow chart 1000 showing one method of at least partially cancelling out the effect of resonance in an output of an LDO regulator circuit. The method includes: coupling a low pass filter (LPF) to an internal node of an LDO regulator circuit, the LPF being settable to one of a plurality of tuning states [Block 1002]; detecting an oscillation in the output of the LDO regulator circuit [Block 1002]; and setting a tuning state for the LPF in response to detecting the oscillation to at least partially cancel out an oscillatory resonance effect in an output of the LDO regulator circuit [Block 1006].

Additional aspects of the above method may include one or more of the following: wherein the resonance effect in the output of the LDO regulator circuit is caused at least in part by a coupled capacitive load; wherein detecting an oscillation in the output of the LDO regulator circuit includes comparing the output to a filtered version of the output and outputting a comparison signal when the output and the filtered version of the output differ; generating a new count output from the comparison signal, and applying the new count output to programmatically set one of the plurality of tuning states of the LPF; counting occurrence of a minimum number of oscillations before generating the new count output from the comparison signal; wherein the internal node is a low impedance node; and/or wherein the LPF is a second-order LPF.

Exemplary Enumerated Embodiments

As described herein, an embodiment of the present invention may relate to one or more of the example embodiments, which are enumerated below. Accordingly, the invention may be embodied in any of the forms described herein, including, but not limited to the following Enumerated Example Embodiments (EEEs) which describe structure, features, and functionality of some portions of the present invention:

EEE1. A low drop-out [LDO] regulator circuit (701) including: a low pass filter [LPF] (702) coupled to an internal node (Y) of the LDO regulator circuit and settable to one of a plurality of tuning states; and an oscillation detector and filter bit control circuit (704), coupled to an output ($V_{OUT}$) of the LDO regulator circuit and to the LPF, and configured to detect an oscillation in the output of the LDO regulator circuit and to set one of the plurality of tuning states of the LPF to at least partially control the oscillation in the output of the LDO regulator circuit.

EEE2. The LDO regulator circuit as recited in enumerated example embodiment 1, wherein the LPF is a second-order LPF.

EEE3. The LDO regulator circuit as recited in enumerated example embodiment 1, wherein the oscillation of the output of the LDO regulator circuit is caused at least in part by a coupled capacitive load (202).

EEE4. The LDO regulator circuit as recited in enumerated example embodiment 3, wherein the LPF includes a plurality of capacitors configured to be programmatically switched into circuit or out of circuit in each tuning state so as to change the effective bandwidth of the LPF.

EEE5. The LDO regulator circuit as recited in enumerated example embodiment 1, wherein the internal node (Y) of the LDO regulator circuit is a low impedance node.

EEE6. A low drop-out (LDO) regulator circuit, including: (a) an error amplifier (204); (b) a driver field effect transistor [FET] (M1); (c) a order low pass filter [LPF] (702) coupled between the error amplifier and the driver FET and settable to one of a plurality of tuning states; and an oscillation detector and filter bit control circuit (704), coupled to the output of the LDO regulator circuit and to the LPF, and configured to detect an oscillation in the output and to set one of the plurality of tuning states of the LPF to at least partially cancel out an oscillation in an output ($V_{OUT}$) of the LDO regulator circuit.

EEE7. The LDO regulator circuit as recited in enumerated example embodiment 6, further including an impedance-lowering device (M0) coupled between the error amplifier and the driver FET (M1).

EEE8. The LDO regulator circuit as recited in enumerated example embodiment 7, wherein the impedance-lowering device is a diode-connected FET (M0).

EEE9. The LDO regulator circuit as recited in enumerated example embodiment 6, wherein the LPF is a second-order LPF.

EEE10. The LDO regulator circuit as recited in enumerated example embodiment 6, wherein the oscillation in the output of the LDO regulator circuit is caused at least in part by a coupled capacitive load (202).

EEE11. The LDO regulator circuit as recited in enumerated example embodiment 6, wherein the LPF includes a plurality of capacitors configured to be programmatically switched into circuit or out of circuit in each tuning state so as to change the effective bandwidth of the LPF.

EEE12. A low drop-out (LDO) regulator circuit, including: (a) an error amplifier (204); (b) a driver field effect transistor [FET] (M1); (c) a second-order low pass filter [LPF] (702) coupled between the error amplifier and the driver FET and programmatically settable to one of a plurality of tuning states; and (d) an oscillation detector and filter bit control circuit (704), coupled to the output of the LDO regulator circuit and to the second-order LPF, and configured to detect an oscillation in the output and to programmatically set one of the plurality of tuning states of the second-order LPF to at least partially cancel out an oscillation in an output of the LDO regulator circuit caused by a coupled capacitive load.

EEE13. The LDO regulator circuit as recited in enumerated example embodiment 12, wherein the second-order LPF includes a plurality of capacitors configured to be programmatically switched into circuit or out of circuit in each tuning state so as to change the effective bandwidth of the second-order LPF.

EEE14. A method of cancelling out an oscillatory resonance effect in an output ($V_{OUT}$) of a low drop-out [LDO] regulator circuit (701), including: (a) coupling a low pass filter [LPF] (702) to an internal node (Y) of the LDO regulator circuit, the LPF being settable to one of a plurality of tuning states; (b) detecting an oscillation in the output of the LDO regulator circuit; and (c) setting a tuning state for the LPF in response to detecting the oscillation to at least partially cancel out an oscillatory resonance effect in an output ($V_{OUT}$) of the LDO regulator circuit.

EEE15. The method as recited in enumerated example embodiment 14, wherein the oscillatory resonance effect in the output of the LDO regulator circuit is caused at least in part by a coupled capacitive load (202).

EEE16. The method as recited in enumerated example embodiment 14, wherein detecting an oscillation in the output of the LDO regulator circuit includes comparing (902) the output ($V_{OUT}$) to a filtered version of the output ($V_{OUT\_F}$) and outputting a comparison signal (Comp_out) when the output and the filtered version of the output differ.

EEE17. The method as recited in enumerated example embodiment 16, further including: (a) generating a new count output (908) from the comparison signal; and (b) applying the new count output to programmatically set one of the plurality of tuning states of the LPF.

EEE18. The method as recited in enumerated example embodiment 17, further including counting occurrence of a minimum number of oscillations (904) before generating the new count output from the comparison signal.

EEE19. The method as recited in enumerated example embodiment 14, wherein the internal node (Y) of the LDO regulator circuit is a low impedance node.

EEE20. The method as recited in enumerated example embodiment 14, wherein the LPF is a second-order LPF.

Fabrication Technologies & Options

The term "MOSFET", as used in this disclosure, includes any field effect transistor (FET) having an insulated gate whose voltage determines the conductivity of the transistor, and encompasses insulated gates having a metal or metal-like, insulator, and/or semiconductor structure. The terms "metal" or "metal-like" include at least one electrically conductive material (such as aluminum, copper, or other metal, or highly doped polysilicon, graphene, or other electrical conductor), "insulator" includes at least one insulating material (such as silicon oxide or other dielectric material), and "semiconductor" includes at least one semiconductor material.

As used in this disclosure, the term "radio frequency" (RF) refers to a rate of oscillation in the range of about 3 kHz to about 300 GHz. This term also includes the frequencies used in wireless communication systems. An RF frequency may be the frequency of an electromagnetic wave or of an alternating voltage or current in a circuit.

Various embodiments of the invention can be implemented to meet a wide variety of specifications. Unless otherwise noted above, selection of suitable component values is a matter of design choice. Various embodiments of the invention may be implemented in any suitable integrated circuit (IC) technology (including but not limited to MOSFET structures), or in hybrid or discrete circuit forms. Integrated circuit embodiments may be fabricated using any suitable substrates and processes, including but not limited to standard bulk silicon, silicon-on-insulator (SOI), and silicon-on-sapphire (SOS). Unless otherwise noted above, embodiments of the invention may be implemented in other transistor technologies such as bipolar, BiCMOS, LDMOS, BCD, GaAs HBT, GaN HEMT, GaAs pHEMT, and MESFET technologies. However, embodiments of the invention are particularly useful when fabricated using an SOI or SOS based process, or when fabricated with processes having similar characteristics. Fabrication in CMOS using SOI or SOS processes enables circuits with low power consumption, the ability to withstand high power signals during operation due to FET stacking, good linearity, and high frequency operation (i.e., radio frequencies up to and exceeding 50 GHz). Monolithic IC implementation is particularly useful since parasitic capacitances generally can be kept low (or at a minimum, kept uniform across all units, permitting them to be compensated) by careful design.

Voltage levels may be adjusted, and/or voltage and/or logic signal polarities reversed, depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functionality without significantly altering the functionality of the disclosed circuits.

Circuits and devices in accordance with the present invention may be used alone or in combination with other components, circuits, and devices. Embodiments of the present invention may be fabricated as integrated circuits (ICs), which may be encased in IC packages and/or in modules for ease of handling, manufacture, and/or improved performance. In particular, IC embodiments of this invention are often used in modules in which one or more of such ICs are combined with other circuit blocks (e.g., filters, amplifiers, passive components, and possibly additional ICs) into one package. The ICs and/or modules are then typically combined with other components, often on a printed circuit board, to form an end product such as a cellular telephone, laptop computer, or electronic tablet, or to form a higher level module which may be used in a wide variety of products, such as vehicles, test equipment, medical devices, etc. Through various configurations of modules and assemblies, such ICs typically enable a mode of communication, often wireless communication.

Conclusion

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, and/or parallel fashion.

It is to be understood that the foregoing description is intended to illustrate and not to limit the scope of the invention, which is defined by the scope of the following claims, and that other embodiments are within the scope of the claims. In particular, the scope of the invention includes any and all feasible combinations of one or more of the processes, machines, manufactures, or compositions of matter set forth in the claims below. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

The invention claimed is:

1. A low drop-out (LDO) regulator circuit configured to be coupled to a capacitive load, the LDO regulator circuit including:

(a) a pass field-effect transistor (FET) including a control gate and configured to produce a voltage output from an input voltage;

(b) a driver FET including a control gate and configured to provide a control voltage to the control gate of the pass FET;

(c) a feedback loop coupled between the voltage output and an internal node;

(d) a low pass filter (LPF) coupled between the internal node and the control gate of the driver FET and settable to one of a plurality of tuning states in response to application of an N-bit binary signal to the LPF; and (e) an oscillation detector and filter bit control circuit, coupled to a voltage output of the LDO regulator circuit and to the LPF, and configured to detect an oscillation in the voltage output of the LDO regulator circuit and to generate a filter bit pattern as the N-bit binary signal as a function of the detected oscillation, wherein the N-bit binary signal selects one of the plurality of tuning states of the LPF to at least partially control the oscillation in the voltage output of the LDO regulator circuit.

2. The LDO regulator circuit of claim 1, wherein the oscillation of the output of the LDO regulator circuit is caused at least in part by thea coupled capacitive load.

3. The LDO regulator circuit of claim 1, wherein the LPF is a second-order LPF.

4. The LDO regulator circuit of claim 1, wherein the LPF includes a plurality of capacitors configured to be programmatically switched into circuit or out of circuit in each tuning state so as to change an effective bandwidth of the LPF.

5. The LDO regulator circuit of claim 4, wherein the LPF is a second-order LPF.

6. The LDO regulator circuit of claim 1, wherein the internal node of the LDO regulator circuit is a low impedance node.

7. The LDO regulator circuit of claim 1, wherein the feedback loop includes an error amplifier including a first input configured to receive a representation of the voltage output, a second input configured to receive a reference voltage, and an output coupled to the internal node.

8. The LDO regulator circuit of claim 7, further including an impedance-lowering device coupled between the output of the error amplifier and the internal node.

9. The LDO regulator circuit of claim 7, further including a diode-connected FET coupled between the output of the error amplifier and the internal node.

10. A low drop-out (LDO) regulator circuit configured to be coupled to a capacitive load, the LDO regulator circuit including:

(a) a pass field-effect transistor (FET) including a control gate and configured to produce a voltage output from an input voltage;

(b) an error amplifier including a first input configured to receive a representation of the output voltage, a second input configured to receive a reference voltage, and an output;

(c) a driver FET configured to provide a control voltage to the control gate of the pass FET;

(d) a low pass filter (LPF) coupled between the output of the error amplifier and the driver FET and settable to one of a plurality of tuning states in response to application of an N-bit binary signal to the LPF; and (e) an oscillation detector and filter bit control circuit, coupled to a voltage output of the LDO regulator circuit and to the LPF, and configured to detect an oscillation in the voltage output and to generate a filter bit pattern as the N-bit binary signal as a function of the detected oscillation, wherein the N-bit binary signal selects one of the plurality of tuning states of the LPF to at least partially cancel out an oscillation in the voltage output of the LDO regulator circuit.

11. The LDO regulator circuit of claim 10, wherein the oscillation in the output of the LDO regulator circuit is caused at least in part by the coupled capacitive load.

12. The LDO regulator circuit of claim 10, wherein the LPF is a second-order LPF.

13. The LDO regulator circuit of claim 10, further including an impedance-lowering device coupled between the output of the error amplifier and the driver FET.

14. The LDO regulator circuit of claim 10, further including a diode-connected FET coupled between the output of the error amplifier and the driver FET.

15. The LDO regulator circuit of claim 10, wherein the LPF includes a plurality of capacitors configured to be programmatically switched into circuit or out of circuit in each tuning state so as to change an effective bandwidth of the LPF.

16. The LDO regulator circuit of claim 15, wherein the LPF is a second-order LPF.

17. A low drop-out (LDO) regulator circuit configured to be coupled to a capacitive load, the LDO regulator circuit including:

(a) a pass field-effect transistor (FET) including a control gate and configured to produce a voltage output from an input voltage;

(b) an error amplifier including a first input configured to receive a representation of the output voltage, a second input configured to receive a reference voltage, and an output;

(c) a driver FET configured to provide a control voltage to the control gate of the pass FET;

(d) a second-order low pass filter (LPF) coupled between the output of the error amplifier and the driver FET and programmatically settable to one of a plurality of tuning states in response to application of an N-bit binary signal to the LPF; and (e) an oscillation detector and filter bit control circuit, coupled to a voltage output of the LDO regulator circuit and to the second-order LPF, and configured to detect an oscillation in the voltage output and to generate a filter bit pattern as the N-bit binary signal as a function of the detected oscillation, wherein the N-bit binary signal programmatically selects one of the plurality of tuning states of the second-order LPF to at least partially cancel out an oscillation in the voltage output of the LDO regulator circuit caused by the coupled capacitive load.

18. The LDO regulator circuit of claim 17, wherein the second-order LPF includes a plurality of capacitors configured to be programmatically switched into circuit or out of circuit in each tuning state so as to change an effective bandwidth of the second-order LPF.

19. The LDO regulator circuit of claim 17, further including an impedance-lowering device coupled between the output of the error amplifier and the driver FET.

20. The LDO regulator circuit of claim 17, further including a diode-connected FET coupled between the output of the error amplifier and the driver FET.

* * * * *